United States Patent
Just

(10) Patent No.: US 12,057,022 B2
(45) Date of Patent: *Aug. 6, 2024

(54) DRONE ENCROACHMENT AVOIDANCE MONITOR

(71) Applicant: Timothy Just, Victorville, CA (US)

(72) Inventor: Timothy Just, Victorville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/169,669

(22) Filed: Feb. 15, 2023

(65) Prior Publication Data

US 2023/0196926 A1    Jun. 22, 2023

Related U.S. Application Data

(63) Continuation of application No. 17/410,988, filed on Aug. 24, 2021, now Pat. No. 11,875,691, which is a
(Continued)

(51) Int. Cl.
*G08G 5/00* (2006.01)
*G01S 3/04* (2006.01)
(Continued)

(52) U.S. Cl.
CPC .............. *G08G 5/0069* (2013.01); *G01S 3/04* (2013.01); *G01S 3/043* (2013.01); *G01S 3/20* (2013.01);
(Continued)

(58) Field of Classification Search
CPC .......... G08G 1/01; G08G 5/00; G08G 5/0069; G01S 3/04; G01S 3/043; G01S 3/20;
(Continued)

(56) References Cited

U.S. PATENT DOCUMENTS 2,526,094 A   10/1950   Stava
4,942,403 A    7/1990   Yokoyama
(Continued)

FOREIGN PATENT DOCUMENTS

AU    2014311323 B2    7/2018
GB    2536043 A    9/2016
(Continued)

OTHER PUBLICATIONS

"Domestic Drone Countermeasures: Prototypes of the Basic Drone Detection System," 3pp. www.ddcountermeasures.com/products. Downloaded May 27, 2015.
(Continued)

*Primary Examiner* — Mirza F Alam
(74) *Attorney, Agent, or Firm* — Kwan & Olynick LLP

(57) ABSTRACT

Disclosed are examples of systems, apparatus, methods and computer program products for locating unmanned aerial vehicles (UAVs). A region of airspace may be scanned with two scanning apparatuses. Each scanning apparatus may include one or more directional Radio Frequency (RF) antennae. The two scanning apparatuses may have different locations. Radio frequency signals emitted by a UAV can be received at each of the two scanning apparatuses. The received radio frequency signals can be processed to determine a first location of the UAV.

20 Claims, 9 Drawing Sheets

Related U.S. Application Data continuation of application No. 16/852,029, filed on Apr. 17, 2020, now Pat. No. 11,132,909, which is a continuation of application No. 16/261,212, filed on Jan. 29, 2019, now Pat. No. 10,665,117, which is a continuation-in-part of application No. 16/114,086, filed on Aug. 27, 2018, now abandoned, which is a continuation of application No. 14/723,299, filed on May 27, 2015, now Pat. No. 10,089,887.

(60) Provisional application No. 62/129,672, filed on Mar. 6, 2015.

(51) Int. Cl.
| | |
|---|---|
| G01S 3/20 | (2006.01) |
| G01S 3/26 | (2006.01) |
| G01S 5/04 | (2006.01) |
| G01S 11/02 | (2010.01) |
| G01S 11/04 | (2006.01) |
| H01Q 3/04 | (2006.01) |
| H01Q 3/06 | (2006.01) |
| H01Q 3/08 | (2006.01) |
| H01Q 11/08 | (2006.01) |
| H01Q 21/30 | (2006.01) |
| H04B 7/185 | (2006.01) |
| H04B 17/27 | (2015.01) |
| H04B 17/318 | (2015.01) |
| G08G 5/02 | (2006.01) |
| H01Q 1/42 | (2006.01) |
| H01Q 21/28 | (2006.01) |

(52) U.S. Cl.
CPC .................. *G01S 3/26* (2013.01); *G01S 5/04* (2013.01); *G01S 11/02* (2013.01); *G01S 11/04* (2013.01); *G08G 5/0013* (2013.01); *G08G 5/0043* (2013.01); *G08G 5/0082* (2013.01); *H01Q 3/04* (2013.01); *H01Q 3/06* (2013.01); *H01Q 3/08* (2013.01); *H01Q 11/08* (2013.01); *H01Q 21/30* (2013.01); *H04B 7/18502* (2013.01); *H04B 17/27* (2015.01); *H04B 17/318* (2015.01); *G08G 5/0026* (2013.01); *G08G 5/0065* (2013.01); *G08G 5/025* (2013.01); *H01Q 1/42* (2013.01); *H01Q 21/28* (2013.01)

(58) Field of Classification Search
CPC ............ G01S 3/26; G01S 11/02; G01S 11/04; H04B 17/27; H04B 17/318; H01Q 3/06; H01Q 3/08
See application file for complete search history.

(56) References Cited

U.S. PATENT DOCUMENTS

| | | | |
|---|---|---|---|
| 5,785,281 A * | 7/1998 | Peter | ...................... G05D 1/101 244/3.17 |
| 6,310,582 B1 | 10/2001 | Uetake et al. | |
| 6,868,314 B1 | 3/2005 | Frink | |
| 7,012,552 B2 * | 3/2006 | Baugh | ....................... G01S 5/12 342/55 |
| 8,723,730 B2 | 5/2014 | Lu et al. | |
| 8,878,726 B2 | 11/2014 | Lu | |
| 9,087,451 B1 | 7/2015 | Jarrell | |
| 9,182,469 B2 | 11/2015 | Harriman | |
| 9,874,625 B2 | 1/2018 | Miller | |
| 10,089,887 B2 * | 10/2018 | Just | ........................... G01S 3/26 |
| 10,665,116 B2 | 5/2020 | Just | |
| 10,665,117 B2 | 5/2020 | Just | |
| 11,100,810 B2 | 8/2021 | Just | |
| 11,132,909 B2 | 9/2021 | Just | |
| 11,875,691 B2 | 1/2024 | Just | |
| 2002/0169578 A1 | 11/2002 | Yang | |
| 2004/0219877 A1 | 11/2004 | Myer et al. | |
| 2004/0246178 A1 | 12/2004 | Smith | |
| 2005/0156777 A1 | 7/2005 | King et al. | |
| 2006/0052912 A1 | 3/2006 | Meunier | |
| 2008/0088508 A1 * | 4/2008 | Smith | .................... G01S 13/878 342/453 |
| 2008/0094212 A1 * | 4/2008 | Breed | ................ G08B 13/2491 340/541 |
| 2009/0134273 A1 | 5/2009 | Page et al. | |
| 2010/0284249 A1 | 11/2010 | Steadman | |
| 2011/0103293 A1 | 5/2011 | Gale et al. | |
| 2011/0215922 A1 | 9/2011 | Armstrong | |
| 2011/0267222 A1 | 11/2011 | Craig | |
| 2011/0285590 A1 | 11/2011 | Wellington | |
| 2012/0026042 A1 | 2/2012 | Gooch et al. | |
| 2012/0313820 A1 | 12/2012 | Tyree | |
| 2013/0181867 A1 | 7/2013 | Sturdivant et al. | |
| 2014/0002293 A1 | 1/2014 | Behrens et al. | |
| 2014/0111147 A1 | 4/2014 | Soar | |
| 2014/0125523 A1 | 5/2014 | Bauman | |
| 2014/0139366 A1 | 5/2014 | Moses et al. | |
| 2015/0116155 A1 | 4/2015 | Chibane et al. | |
| 2015/0199802 A1 | 7/2015 | Freeman et al. | |
| 2015/0301150 A1 | 10/2015 | Stuckman et al. | |
| 2016/0088498 A1 | 3/2016 | Sharawi | |
| 2016/0225264 A1 | 8/2016 | Taveira | |
| 2016/0247405 A1 | 8/2016 | Paczan et al. | |
| 2017/0039860 A1 | 2/2017 | Just | |
| 2017/0177925 A1 * | 6/2017 | Volkart | ................... G06V 20/13 |
| 2019/0005830 A1 | 1/2019 | Just | |
| 2019/0164442 A1 | 5/2019 | Just | |
| 2019/0219682 A1 | 7/2019 | Parker et al. | |
| 2020/0027359 A1 | 1/2020 | Just | |
| 2020/0265728 A1 | 8/2020 | Just | |
| 2020/0265729 A1 | 8/2020 | Just | |
| 2021/0343167 A1 | 11/2021 | Just | |
| 2021/0383707 A1 | 12/2021 | Just | |

FOREIGN PATENT DOCUMENTS

| | | |
|---|---|---|
| RU | 2526094 C1 | 8/2014 |
| WO | 2016144808 A1 | 9/2016 |

OTHER PUBLICATIONS

"Drone Shield: Drone Detection and Response," 2pp. www.droneshield.org. Downloaded May 27, 2015.

"Drone-Detector," 4 pp. www.drone-detector.com/en/drone-detector-main-features/. Downloaded May 27, 2015.

Ahmed Badawy, et al. A Simple Angle of Arrival Estimation Scheme, 1st International Conference on Sensing Technology, Nov. 21-23, 2005, Palmerston North, New Zealand. 13 pages.

Andrew Robertson, et al. Networks and Communications Branch Information Technology Division, Distributed Transmitter Localization by Power Difference of Arrival (PDOA) on a Network of GNU Radio Sensors, Navel Research Laboratory Washington, D.C. NRL/MR/5524-15-9576. Feb. 3, 2015, 16 pages.

U.S. Appl. No. 16/114,086, Final Rejection, Feb. 18, 2020, 20 pgs.

U.S. Appl. No. 16/114,086, Non-Final Rejection, Oct. 3, 2019, 21 pgs.

U.S. Appl. No. 16/114,089, CTFR—Final Rejection, Jan. 13, 2020, 14 pgs.

U.S. Appl. No. 16/114,089, Non-Final Rejection, Sep. 25, 2019, 21 pgs.

U.S. Appl. No. 16/114,089, Examiner Interview Summary Record (Ptol-413), Jan. 24, 2020, 2 pgs.

U.S. Appl. No. 16/114,089, Notice of Allowance And Fees Due (Ptol-85), Jan. 24, 2020, 14 pgs.

U.S. Appl. No. 16/261,212, Notice of Allowance And Fees Due (Ptol-85), Jan. 21, 2020, 11 pgs.

U.S. Appl. No. 16/261,212, Examiner Interview Summary Record (Ptol-413), Dec. 12, 2019, 3 pages.

U.S. Appl. No. 16/261,212, USPTO e-Office Action: CTNF—Non-Final Rejection, Oct. 2, 2019, 23 pgs.

(56) References Cited

OTHER PUBLICATIONS

U.S. Appl. No. 16/852,029, Non-Final Rejection, Oct. 5, 2020, 30 pgs.
U.S. Appl. No. 16/852,034, Non-Final Rejection, Oct. 30, 2020, 33 pgs.
U.S. Appl. No. 17/377,089, USPTO e-Office Action: CTNF—Non-Final Rejection, Sep. 26, 2022, 66 pages.
U.S. Appl. No. 17/410,988, USPTO e-Office Action: CTFR—Final Rejection, Apr. 3, 2023, 19 pages.
U.S. Appl. No. 17/410,988, USPTO e-Office Action: CTNF—Non-Final Rejection, Aug. 15, 2022, 21 pages.
U.S. Appl. No. 16/852,029, Examiner Interview Summary mailed May 27, 2021, 1 pg.
U.S. Appl. No. 16/852,029, Notice of Allowance mailed May 27, 2021, 14 pgs.
U.S. Appl. No. 16/852,034, Examiner Interview Summary mailed Apr. 19, 2021, 1 pg.
U.S. Appl. No. 16/852,034, Notice of Allowance mailed Apr. 19, 2021, 10 pgs.
De Gante, et al., A Survey of Hybrid Schemes for Location Estimation in Wireless Sensor Networks, SciVerse ScienceDirect, Published by Elsevier Ltd 2013, Procedia Technology 7 (2013) 377-383, 7 pages.
Defendant's First Preliminary Invalidity and Noninfringement Contentions and Responses. Case No. 3:19-cv-14129-BRM-LHG. *Tim Just* v. *Aerodefense LLC* with Exhibit A. Dated Jan. 13, 2020. 25 Pages.
International Search Report and Written Opinion, International Application No. PCT/US2016/21018, dated May 27, 2016, 18 pages.
International Search Report and Written Opinion, International Publication No. 2006/144808, dated Sep. 15, 2016, 13 pages.
Joe C. Chen, Student Member, IEEE, Ralph E. Hudson, and Kung Yao, Fellow, IEEE, "Maximum-Likelihood Source Localization and Unknown Sensor Location Estimation for Wideband Signals in the Near-Field", IEEE Transactions on Signal Processing, vol. 50, No. 8, Aug. 2002, 12 pages.
Koyuncu, et al., A Survey of Indoor Positioning and Object Locating Systems, IJCSNS International Journal of Computer Science and Network Security, vol. 10 No. 5, May 2010. pp. 121-128. 8 pages.
Ravindra S. and Jagadeesha S.N., Time of Arrival Based Localization In Wireless Sensor Networks: A Linear Approach, Signal & Image Processing: An International Journal (SIPIJ) vol. 4, Aug. 2013. 18 pages.
Schaefer, John, Trilateration Versus Triangulation for Indoor Positioning, Published Nov. 28, 2018, http://www.leverege.com/blogpost/trilateration-vs-triangulation. 3 pages.
Timothy TJ Brooks, et al., A Review of Position Tracking Methods, 1st International Conference on Sensing Technology, Nov. 21-23, 2005, Palmerston North, New Zealand. 6 pages.
Waltenegus Dargie and Christian Poellabauer, Fundamentals of Wireless Sensor Networks Theory and Practice, Wiley Series on Wireless Communications and Mobile Computing. A John Wiley and Sons, Ltd., Publication 2010. 311 pages.
Yinjie Chen, et al. On Sampling Signal Strength for Localization Using a Directional Antenna, 978-1-4577-0351-5/11/$26.00 © 2011 IEEE, 6 pages.
U.S. Appl. No. 17/410,988, USPTO e-Office Action: NOA—Notice Of Allowance And Fees Due (Ptol-85), Sep. 19, 2023, 9 pages.

* cited by examiner

DRONE ENCROACHMENT AVOIDANCE MONITOR

PRIORITY DATA

This patent document is a continuation of and claims priority to U.S. patent application Ser. No. 17/410,988, titled "Drone Encroachment Avoidance Monitor", by Timothy Just, filed 24 Aug. 2021, which, is a continuation of and claims priority to U.S. patent application Ser. No. 16/852,029, titled "Drone Encroachment Avoidance Monitor", by Timothy Just, filed 17 Apr. 2020, which, is a continuation of and claims priority to U.S. patent application Ser. No. 16/261,212 (now U.S. Pat. No. 10,665,117), titled "Drone Encroachment Avoidance Monitor", by Timothy Just, filed 29 Jan. 2019, which is a continuation in part of and claims the benefit of U.S. patent application Ser. No. 16/114,086, titled "Drone Encroachment Avoidance Monitor", by Timothy Just, filed 27 Aug. 2018, which is a continuation of and claims priority to U.S. patent application Ser. No. 14/723,299 (now U.S. Pat. No. 10,089,887), titled "Drone Encroachment Avoidance Monitor", by Timothy Just, filed 27 May 2015, which claims priority to U.S. Provisional Patent Application No. 62/129,672, titled "Drone Encroachment Avoidance Monitor", by Timothy Just, filed 6 Mar. 2015. U.S. patent application Ser. No. 17/410,988, U.S. patent application Ser. No. 16/852,029, U.S. patent application Ser. No. 16/261,212 (now U.S. Pat. No. 10,665,117), U.S. patent application Ser. No. 16/114,086, U.S. patent application Ser. No. 14/723,299 (now U.S. Pat. No. 10,089,887), and U.S. Provisional Patent Application No. 62/129,672 are incorporated herein by reference in their entirety for all purposes.

TECHNICAL FIELD

This patent document generally relates to unmanned aerial vehicles (UAVs). More specifically, this patent document discloses techniques for detecting and/or locating UAVs.

BACKGROUND

A diverse assortment of UAVs can be obtained by a wide variety of users in the marketplace. Some of such UAVs can be piloted with little skill and can reach a broad range of locations.

SUMMARY

Methods, systems, apparatuses, and computer program products for detecting and/or locating unmanned aerial vehicles (UAVs) are disclosed herein. Some of the disclosed techniques may be used for detecting small UAVs, such as those weighing approximately 10 pounds or less, sometimes referred to as micro-UAVs, micro-drones, quad-copters or multi-rotors, and referred to herein below as micro-UAVs. Detecting and locating UAVs may enhance the safety of secure locations such as airports, military bases, and other landmarks.

Among various embodiments disclosed herein is a method of locating UAVs. The method involves scanning a region of airspace with two scanning apparatuses. Each scanning apparatus may include one or more directional Radio Frequency (RF) antennae. The two scanning apparatuses may have different locations. Radio frequency signals emitted by a UAV can be received at each of the two scanning apparatuses. The received radio frequency signals can be processed to determine a location of the UAV.

Also described is an apparatus for detecting UAVs. The apparatus may include a rotatable structure configured to rotate in a horizontal plane about a vertical axis. A first array of one or more directional antennae may be connected with the rotatable structure. The first array may be statically deployed along the vertical axis. A second array of one or more directional antennae may be connected with the rotatable structure. The second array may be configured to rotate in a vertical plane about a horizontal axis.

These and other features will be described in more detail below with reference to the drawings.

BRIEF DESCRIPTION OF THE DRAWINGS

The included drawings are for illustrative purposes and serve only to provide examples of possible structures and operations for the disclosed inventive systems, apparatus, methods and computer program products for locating unmanned aerial vehicles (UAVs). These drawings in no way limit any changes in form and detail that may be made by one skilled in the art without departing from the spirit and scope of the disclosed implementations.

DETAILED DESCRIPTION

Figure 1A:
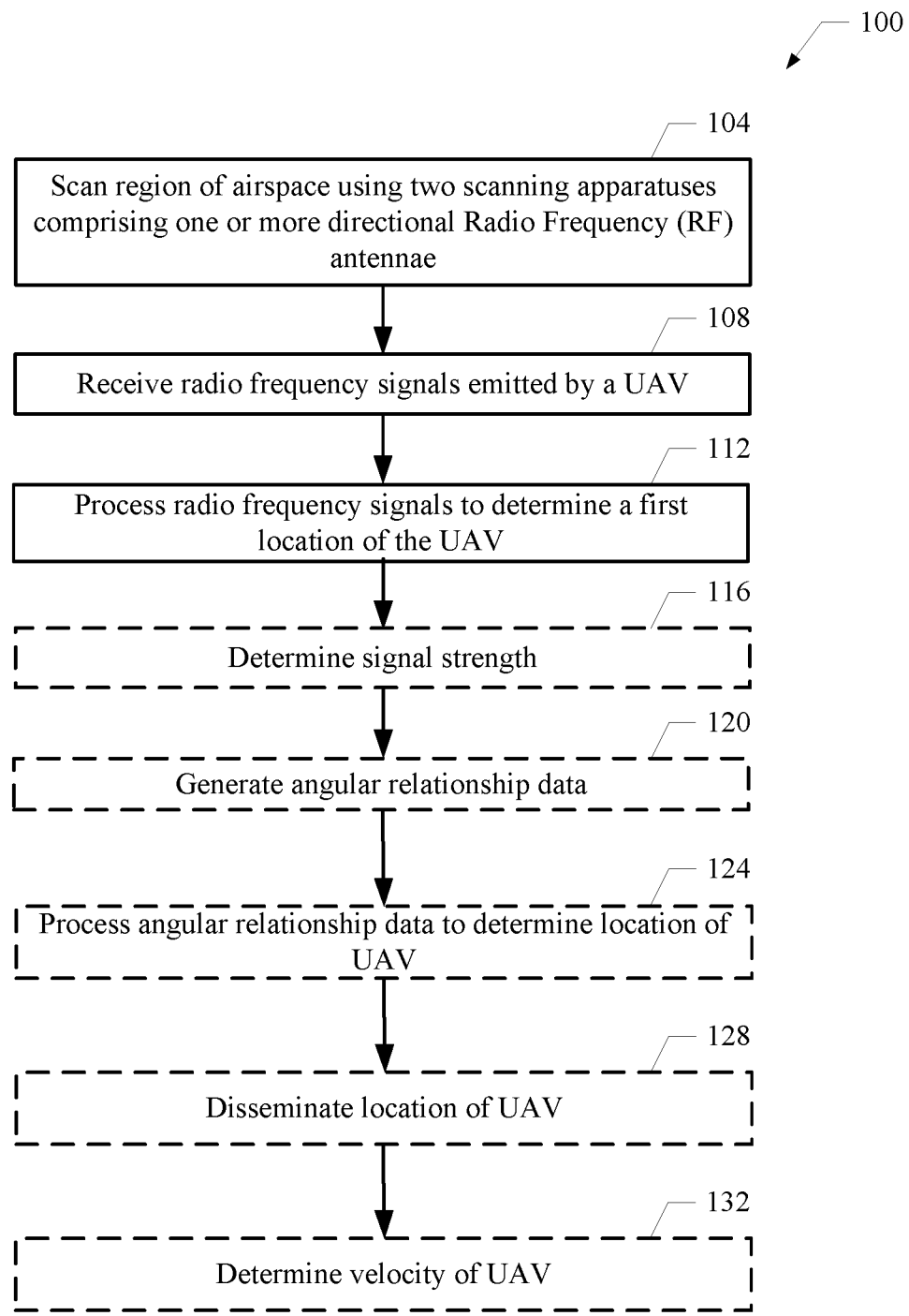
FIG. 1A shows a flowchart of an example of a method 100 for locating unmanned aerial vehicles (UAVs), performed in accordance with some implementations.

This disclosure describes some techniques, methods, systems, apparatus, and computer program products that can be used for detecting "Unmanned Aerial Vehicles" (UAVs). The techniques may be particularly, though not exclusively, applicable to detection of small UAVs, such as those weighing approximately 10 pounds or less, sometimes referred to as micro-UAVs, micro-drones, quad-copters or multi-rotors, and referred to herein below as micro-UAVs. Such micro-UAVs can be too small to detect using conventional Radio Detection And Ranging (RADAR) technology and can pose significant risks, which are difficult to mitigate using traditional techniques. For example, an undetected micro-UAV could be used to drop an explosive, chemical, or biological weapon, in a crowded location. Or, a micro-UAV flown at or near an airport, whether or not with nefarious intentions, could be a safety concern for commercial, civil or other aviation. Such risks are underscored by a recent spate of micro-UAV incursions near sensitive locations such as airports, governmental residences, military bases, and monuments.

Unfortunately, conventional technology, such as static non-directional antennae, can be unreliable when used to scan for micro-UAVs. For example, while a single non-directional antenna can receive downlink radio frequency signals from a micro-UAV, it cannot resolve the location of the micro-UAV. A configuration of four or more non-directional antennae at different locations might be usable to resolve a bearing of a micro-UAV by comparing differences in signal strength across each of the non-directional antennae. However, such a configuration cannot reliably be used to determine the elevation of a detected micro-UAV, using differences in signal strength alone.

Due to the relative ease of acquiring micro-UAVs and the difficulty of detecting them, a wide range of individuals can become amateur micro-UAV pilots, leading to potentially disastrous risks. By way of example, there is currently nothing to prevent a micro-UAV pilot with poor judgment or bad intentions from remotely flying a micro-UAV into the flight path of a commercial airliner taking-off or landing at an airport.

Some of the disclosed techniques can be used to mitigate some risks posed by micro-UAVs by reliably detecting and locating such micro-UAVs. Returning to the example of the preceding paragraph, two or more statically deployed scanning apparatuses, which are configured to detect micro-UAVs, can be placed in strategic locations near the airport runway. Such statically deployed scanning apparatuses are referred to herein as Ground Data Terminals (GDTs) and can be configured to sweep for micro-UAVs and collect bearing and elevation data for each detected micro-UAV, as described below. In some implementations, each GDT may include one or more directional antennae configured to receive 5.8 Gigahertz (GHz) radio frequency signals, the standard downlink frequency of micro-UAVs. Such directional antennae can be configured to rotate 360 degrees in two orthogonal planes such that each GDT can receive signals originating from any direction in the sky. The bearing and elevation of the micro-UAV relative to two or more GDTs can be detected and transmitted to a processing location such as a primary processor, or cloud-based distributed computing system, which can use triangulation techniques to locate the micro-UAV, e.g., the elevation of a UAV's downlink signal can be tracked and a primary processor can solve for the altitude of the UAV. The primary processor or cloud-based distributed computing system can then disseminate location information for the micro-UAV to appropriate parties, for example, air traffic control, aircraft, law enforcement or security to take corrective action. For example, an aircraft could be redirected to avoid a collision.

Figure 1B:
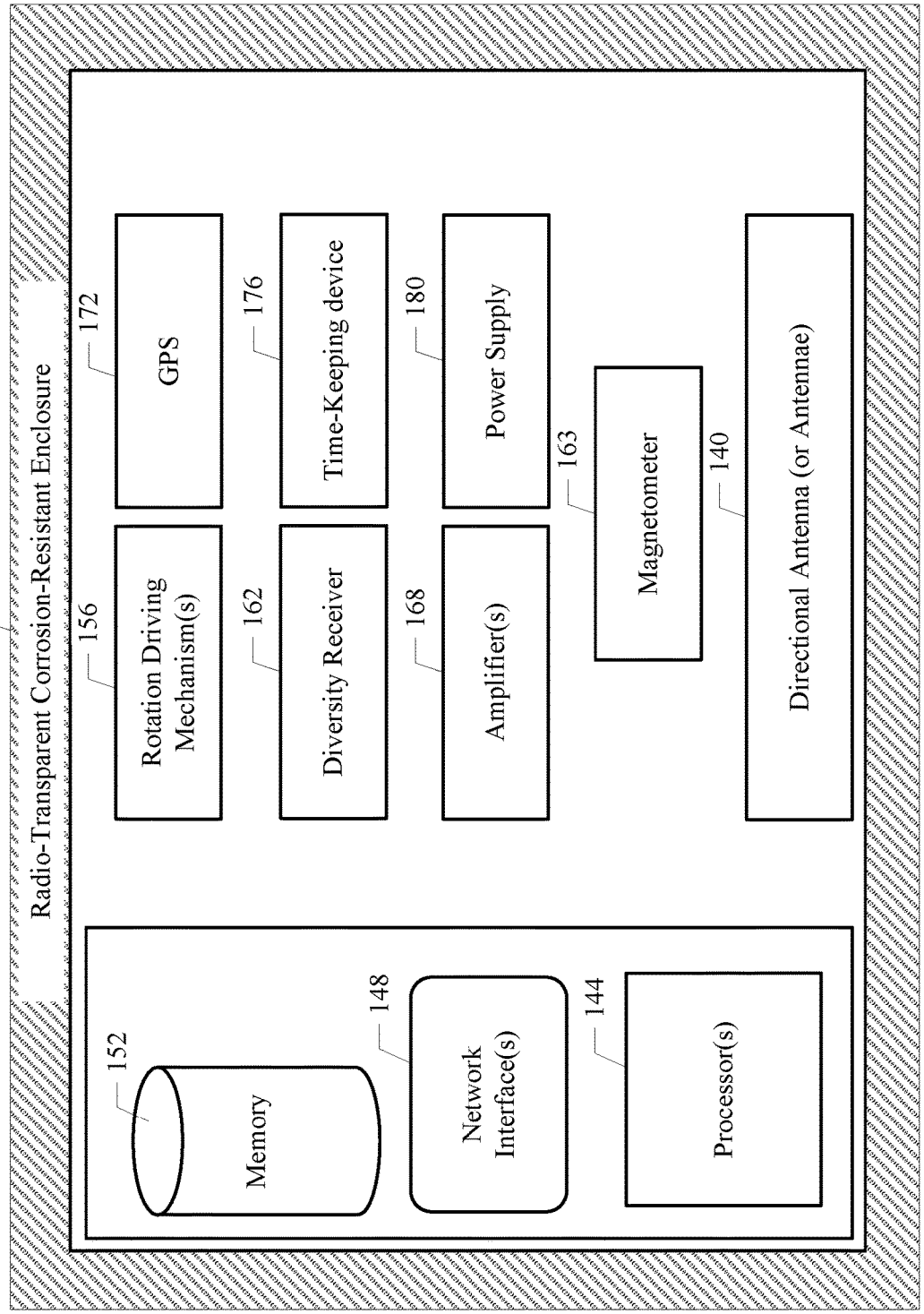
FIG. 1B shows a simplified block diagram of an example of a scanning apparatus 136, in accordance with some implementations.
Figure 2:
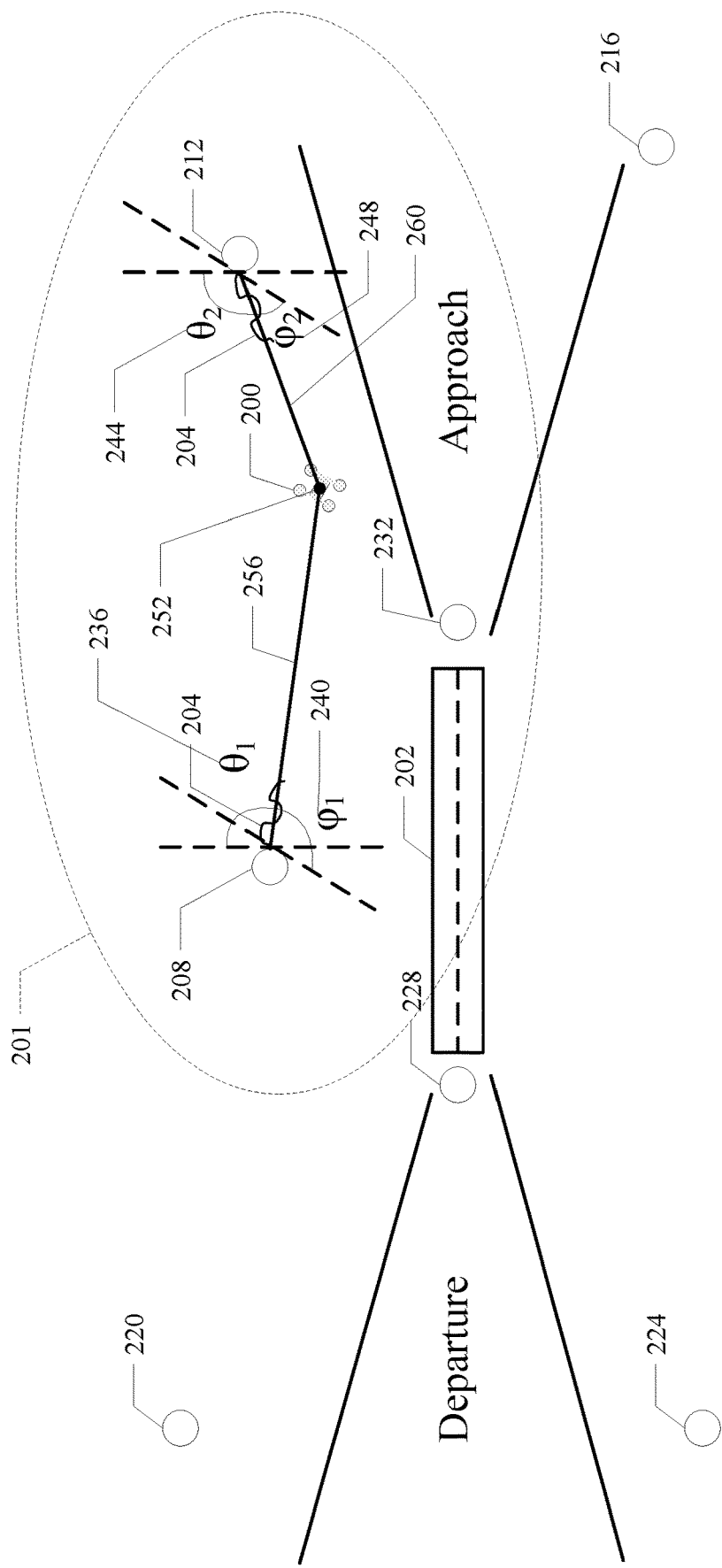
FIG. 2 shows a simplified diagram of an example of a configuration of statically deployed scanning apparatuses in the vicinity of an airport runway, in accordance with some implementations
Figure 3:
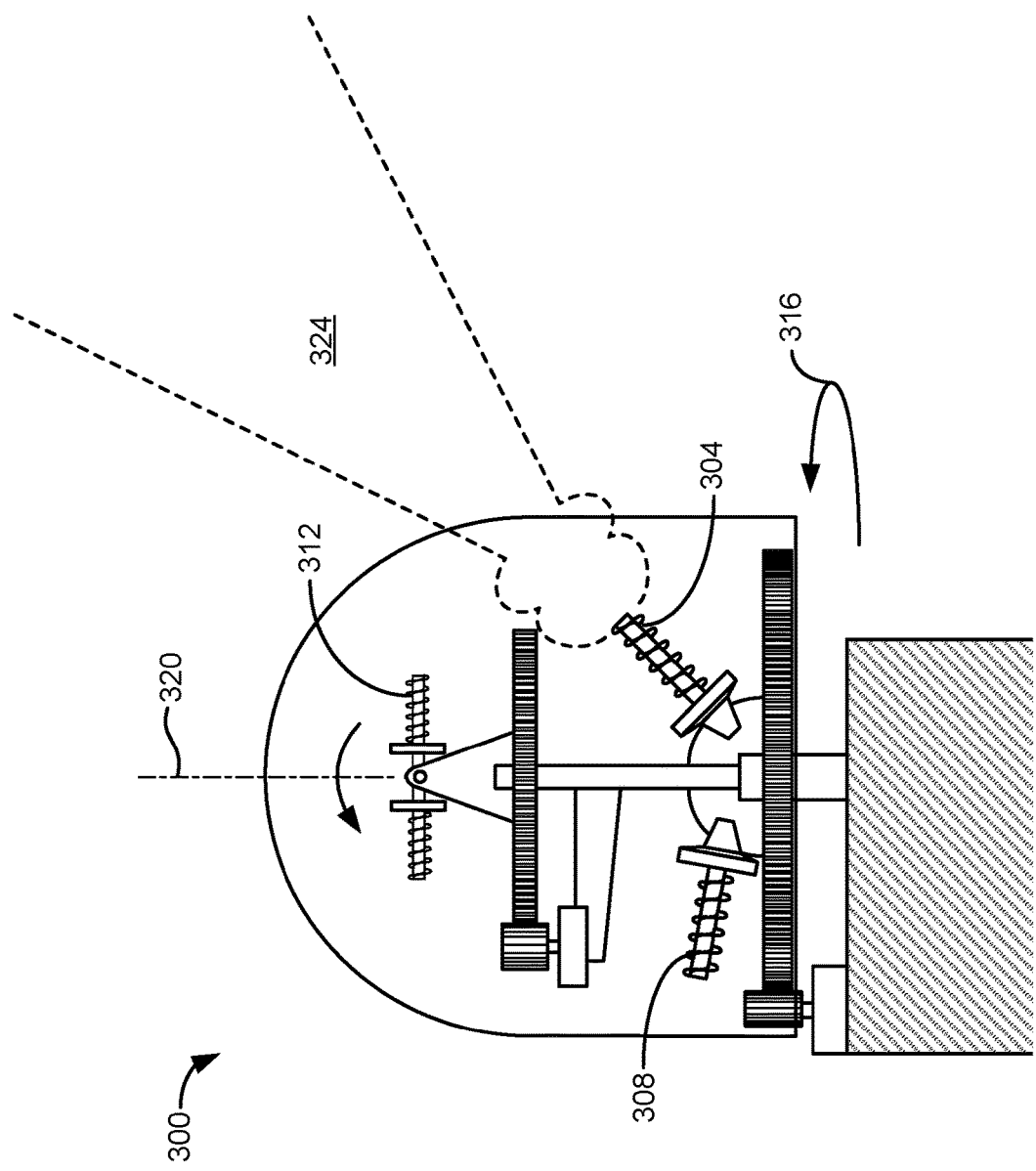
FIG. 3 shows a simplified diagram of an example of a scanning apparatus 300, in accordance with some implementations.
Figure 4:
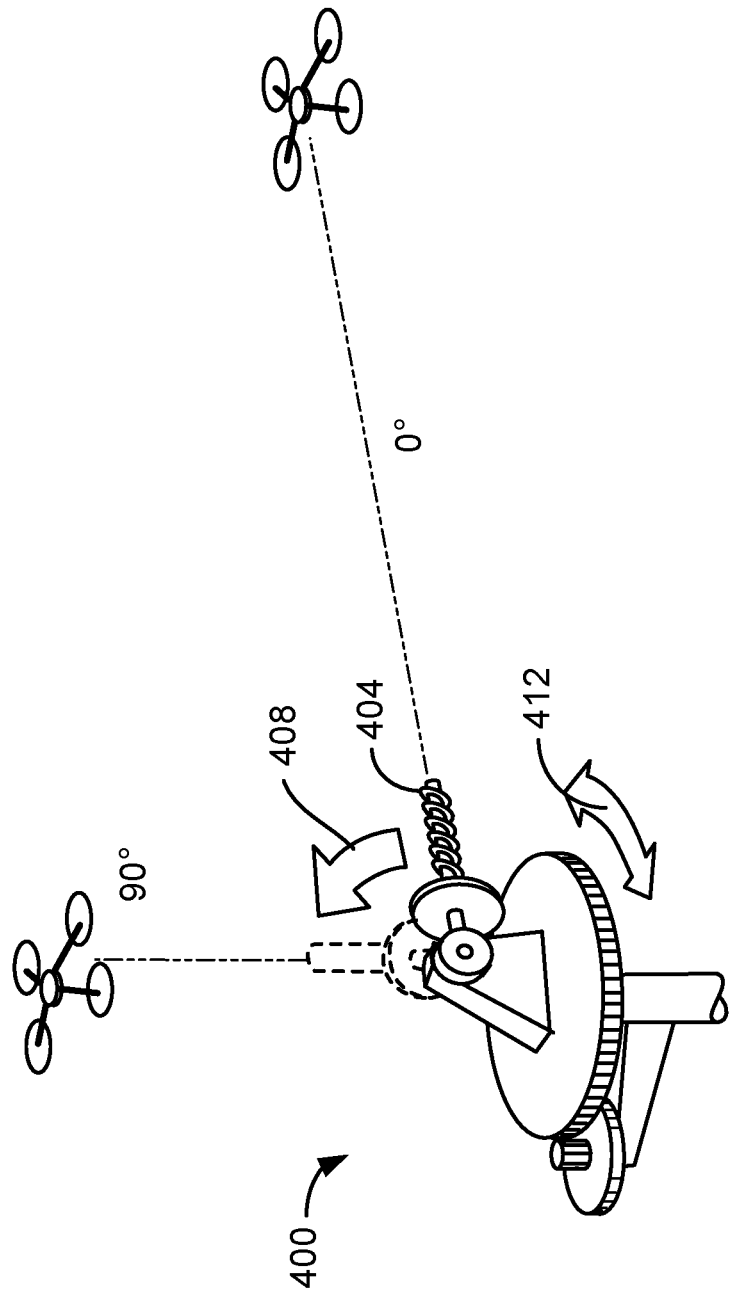
FIG. 4 shows another simplified diagram of an example of a scanning apparatus 400, in accordance with some implementations.
Figure 5:
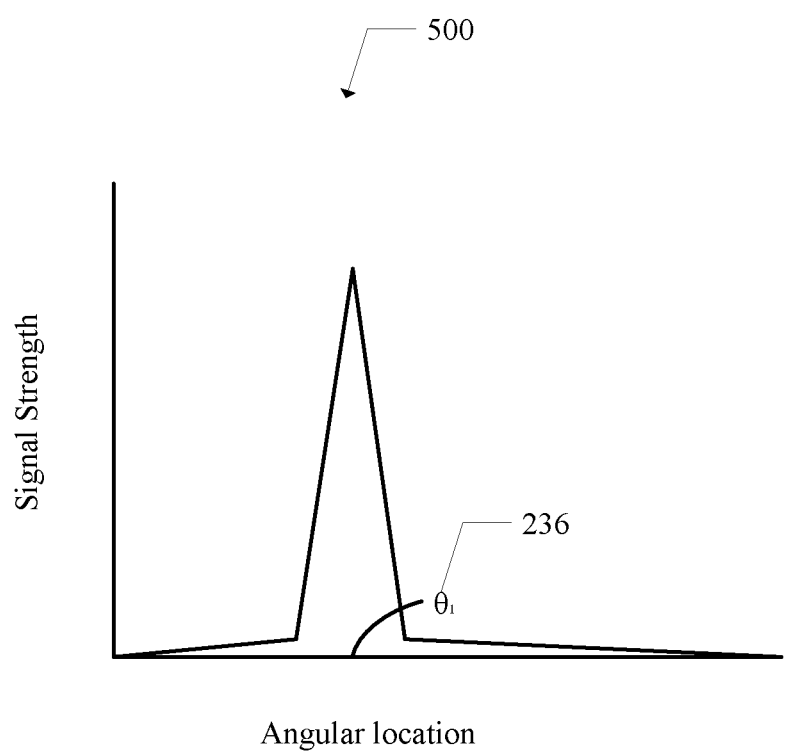
FIG. 5 shows example of a graph of signal strength of radio signals received by Ground Data Terminal (GDT) 208 of FIG. 2, in accordance with some implementations.

FIG. 1A shows a flowchart of an example of a method 100 for locating unmanned aerial vehicles (UAVs), performed in accordance with some implementations. FIG. 1A is described with reference to FIGS. 1B-5. FIG. 1B shows a simplified block diagram of an example of a scanning apparatus 136, in accordance with some implementations. FIG. 2 shows a simplified diagram of an example of a configuration of statically deployed scanning apparatuses (or GDTs) in the vicinity of an airport runway, in accordance with some implementations. FIG. 3 shows a simplified diagram of an example of a scanning apparatus, in accordance with some implementations. FIG. 4 shows another simplified diagram of an example of a scanning apparatus, in accordance with some implementations. FIG. 5 shows example of a graph of signal strength of radio signals received by GDT 208 of FIG. 2, in accordance with some implementations.

At 104 of FIG. 1A, a region 201 of airspace is scanned by two scanning apparatuses in the form of GDTs 208 and 212 of FIG. 2. In some implementations, a region of airspace can be scanned by more than two scanning apparatuses. However, one having skill in the art would appreciate that at least two scanning apparatuses are required to perform the triangulation techniques explained below in the context of 124 of FIG. 1. A wide variety scanning apparatuses can be used to scan a region of airspace, as described below. For example, some scanning apparatuses can be statically deployed in varying locations on the ground. As described above, such statically deployed scanning apparatuses are referred to herein as GDTs. Also or alternatively, scanning apparatuses can be dynamically deployed. For example, scanning apparatuses can be mounted on a vehicle, such as a commercial aircraft, as discussed below. Additionally, in some implementations, scanning apparatuses can be portable.

The inner workings of a scanning apparatus, such as a GDT, can vary across implementations. A simplified block diagram of an example of such a scanning apparatus 136 is shown in FIG. 1B. In some implementations, scanning apparatus 136 may include some (or all) of a number of components, such as directional antenna (or antennae) 140, processor(s) 144, network interface(s) 148, memory 152, rotation driving mechanism(s) 156, diversity receiver 162, amplifier(s) 168, global positioning system (GPS) 172, time-keeping device 176, power source 180, and enclosure 184, which are each discussed in further detail below.

Some components of scanning apparatus 136 can be deployed or configured in a variety of manners. For example, directional antennae 140 may be configured to receive signals from a micro-UAV. Scanning apparatus 136 may be equipped with multiple high-gain directional antennae configured to receive 2.4 Giga Hertz (GHz), and/or 5.8 GHz electromagnetic signals, which are standard uplink and downlink frequencies of micro-UAVs, respectively. Additionally, such antennae may be tunable to other radio frequency ranges in order to detect micro-UAVs operating in different frequency bands. By way of example, if micro-UAVs are operated with a downlink frequency of 933 MHz, directional antennae 140 can be configured to receive 933 MHz signals. Antennae 140 can rotate in a number of directions or planes to detect micro-UAVs or micro-UAV operators in a variety of locations, as discussed below. As such, the configuration of antennae 140 can vary greatly, as described below in the context of implementations shown in FIGS. 3 and 4, as well as other implementations.

Many UAVs may be operated by cellular devices. As such, an uplink signal used to operate such UAVs may have a frequency that is standard among cellular devices. Therefore, Scanning apparatus 136 may be equipped with multiple high-gain directional antennae configured to receive electromagnetic signals having frequencies in the standard operating bands of cellular devices. By way of illustration, the antennae of scanning apparatus 136 may be configured to receive signals in the frequency ranges of 1850-1990 MHz (e.g., the cellular frequency band of 1900 MHz) or 824-894 MHz (e.g., the PCS frequency band of 800 MHz).

FIG. 3 shows a simplified diagram of one such scanning apparatus 300, which is an example of a scanning apparatus 136 that includes three directional antennae 304-312. Scanning apparatus 300 includes directional antenna 304 and directional antenna 308, which are configured to rotate 360 degrees in a horizontal plane 316 to obtain bearing data for encroaching micro-UAVs, as described below. Directional antenna 304 and directional antenna 308 can be configured to receive signals within either the same or different angular ranges. Directional antenna array 312 (which could be one or more antennae) is configured to rotate 360 degrees in a vertical plane 320 in order to collect elevation data for encroaching micro-UAVs, as described below. One having skill in the art can appreciate that horizontal plane 316 and vertical plane 320 can be substantially orthogonal—e.g. the angle between horizontal plane 316 and vertical plane 320 need not be precisely 90 degrees.

The beamwidth of a directional antennae, such as directional antennae 304-312 can vary across implementations. For example, region 324 is a hypothetical beamwidth of directional antenna 304. An array of adjacently placed directional antennae may be used in place of a single directional antenna to increase beamwidth.

Alternatively, in some implementations, a scanning apparatus might contain only a single directional antenna. For instance, scanning apparatus 400 of FIG. 4 is an example of a scanning apparatus 136 that includes a single directional antenna. Scanning apparatus 400 includes directional antenna 404, which is configured to rotate from 0 to 90 degrees in a vertical plane 408 and 360 degrees in a horizontal plane 412. Since, directional antenna 404 can rotate such that it can scan the entire sky for micro-UAVs, directional antenna 404 can obtain both bearing and elevation data for encroaching micro-UAVs, as described below. Since scanning apparatus 400 is compact and contains only one directional antenna, it can be particularly useful in several implementations described below, such as an aircraft-mounted scanning apparatus, which is configured to locate micro-UAV operators.

In other implementations, a scanning apparatus may include an array of directional antennae, which may be statically deployed along a substantially vertical axis and rotatable up to 360° along a substantially orthogonal horizontal axis to scan for micro-UAV targets. Such an array of antennae can resolve an elevation of a micro-UAV at a given angle of rotation by comparing signal strength differences measured by each antenna. In other words, each statically deployed antenna can detect signals originating in different angular ranges. By way of example, a scanning apparatus might have a first, second, and third antenna statically deployed relative to a vertical axis at 15, 45, and 75 degree angles respectively. The first antenna might detect signals originating at an elevation between 0 and 29 degrees, the second antenna might detect signals originating at an elevation between 30 and 59 degrees, and the third antenna might detect signals originating at an elevation between 60 and 90 degrees.

As mentioned above, additional components of a scanning apparatus, such as scanning apparatus 136 of FIG. 1B, can vary greatly across implementations. For example, scanning apparatus 136 may include one or more rotation driving mechanisms 156, such as an electric motor, to drive the rotation of directional antennae and/or platforms to which such antennae are attached. Rotation driving mechanism 156 can be connected with a system of gears such that rotation driving mechanism 156 can cause the directional antennae 140 and/or platforms to which directional antennae 140 are attached to rotate.

Scanning apparatus 136 may also include a diversity receiver 162 such that scanning apparatus 136 can receive signals multiple directional antennae 140 and diversity receiver 162 can be used to measure the signal strength of such signals. In some implementations, an amplifier (or amplifiers) 168 can be used to amplify signals received by directional antennae 140. In some implementations, scanning apparatus 136 may include a magnetometer 163, which can provide a reference point, based on the earth's magnetic field, for collecting bearing data, which is discussed in further detail below.

Also or alternatively, scanning apparatus 136 may include a GPS 172 capable of providing data indicating the location of scanning apparatus 136. Scanning apparatus 136 may also include a time-keeping device 176 such as a Hobbs Meter, or a clock, or other device capable of measuring time.

In some implementations, scanning apparatus 136 may include one or more network interfaces 144 or a wireless or wired communication module to enable communication with other scanning apparatuses or with a primary processing module, as described below.

In some implementations, scanning apparatus 136 may also include memory 152 such as one or more storage media. Such storage may include either or both volatile or nonvolatile storage media and can provide non-transitory storage for computer readable instructions, data structures, program modules and other data for the operation of the scanning apparatus. Also or alternatively, scanning apparatus 136 may include one or more single or multi-core processors 144 configured to execute stored instructions.

In some implementations, scanning apparatus 136 may include an internal power supply 180 such as a battery or attached solar panels. Alternatively, scanning apparatus 136 may be connected with an external power supply, such as a light pole as discussed below in the context of FIG. 6.

In order to increase the durability of scanning apparatus 136, directional antennae 140 and other components of scanning apparatus 136 may be enclosed in enclosure 184. Enclosure 184 may be composed of a radio frequency transparent, corrosion-resistant, lightning-protected, and wind-resistant material such as fiberglass.

Scanning apparatuses can be deployed in a range of manners. For example, FIG. 2 shows a configuration of statically deployed scanning apparatuses, or more specifically GDTs 208-232, placed near an airport runway 202. Each GDT 208-232 of FIG. 2 can take the form of scanning apparatus 300 of FIG. 3, scanning apparatus 400 of FIG. 4, another type of scanning apparatus, or a combination of such scanning apparatuses. Such a configuration of GDTs can be used to scan portions of the sky near an airport for micro-UAVs, helping to avert collisions and near misses with airliners, as described above. For instance, in the example of FIG. 2, GDT 208 is located on or near an Air Traffic Control (ATC) tower, GDTs 212 and 216 are located along a typical approach corridor, GDTs 220 and 224 are located along a typical departure corridor and GDTs 228 and 232 are located on opposing ends of runway 202.

Returning to FIG. 1A, at 108, radio signals 204, of FIG. 2, are transmitted by micro-UAV 200 and received at GDTs 208 and 212. GDT 208 and GDT 212 have different locations, as discussed above. Similarly, as discussed above, GDTs 208 and 212 may be any combination of scanning apparatuses discussed above, or any other type of scanning apparatus that may include one or more directional antennae, which are configured to receive signals from micro-UAVs or micro-UAV operators.

At 112 of FIG. 1A, radio signals 204 are processed to determine a first location 252 of micro-UAV 200. Such processing can vary across implementations and determining the first location 252 of micro-UAV 200 can be accomplished in a number of manners. For instance, 116-124 of FIG. 1A offer an example illustrating several ways in which, radio signals 204 can be processed to determine a first location 252 of micro-UAV 200.

In some implementations, at 116, a signal strength of the radio signals 204 is determined by GDTs 208 and 212. For example, one or more directional antennae of GDTs 208 and 212 can be configured to receive 5.8 GHz radio signals, as described above. As such, radio signals 204, which have a 5.8 GHz frequency, can be received by such directional antennae. In some implementations, such antennae can be connected with an amplifier. Radio signals 204 can be transmitted from the antenna to an amplifier and on to a receiver, such as a diversity receiver, at which the signal strength of radio signals 204 can be measured. Alternatively, radio signals 204 can also be transmitted directly from an antenna to a receiver, without an intervening amplifier. Graph 500 of FIG. 5 shows an example of signal strength measurements of a directional antenna or array of directional antennae of GDT 208 throughout a single polar (or vertical) rotation.

In some implementations, at 120 of FIG. 1A, data indicating an angular relationship between locations of GDTs 208 and 212 and a detected micro-UAV 200 of FIG. 2 is generated. For example, a processor of GDTs 208 and 212 can process signal strength measurements determined at 112 of FIG. 1A to determine a location of a peak 5.8 GHz signal strength in the polar and azimuthal planes. In other words, GDT 208 can determine an elevation of a peak 5.8 GHz signal strength at $\theta_1$ 236, as shown in FIG. 5. Along the same lines, GDT 208 can determine a bearing of a peak 5.8 GHz signal strength in the azimuthal plane at $\phi_1$ 240. Since the standard uplink frequency of a micro-UAV is 5.8 GHz, GDT 208 can infer the presence of micro-UAV 200 at an elevation of $\theta_1$ 236 and a bearing of $\phi_1$ 240.

Alternatively, GDT 208 may not include a processor, but rather, GDT 208 might merely measure 5.8 GHz signal strength in the polar and azimuthal planes, and transmit such signal strength measurements to a primary processor or cloud-based distributed computing system, as described below. The primary processor or cloud-based distributed computing system can process the signal strength measurements, as described in the preceding paragraph, and determine the presence of micro-UAV 200 at an elevation and bearing of $\theta_1$ 236 and $\phi_1$ 240 respectively, with respect to GDT 208.

Using similar techniques, it can be determined by GDT 212, or by a primary processor or cloud-based distributed computing system, that micro-UAV 200 is at an elevation and bearing of $\theta_2$ 244 and $\phi_2$ 248 respectively, with respect to GDT 212.

In some implementations, a rate of rotation (also referred to herein as a slew rate) of a directional antenna (or antennae) of a scanning apparatus can be configured to vary throughout a rotation to increase accuracy in determining an angular relationship between the scanning apparatus and a micro-UAV. For instance, a directional antenna (or antennae) in a scanning apparatus can be configured to rotate slowly in a given rotation when the antenna (or antennae) is within a designated angular distance (e.g. within 10 degrees) of a detected micro-UAV. The antenna (or antennae) can rotate more quickly when the antenna (or antennae) is greater than the designated angular distance from the micro-UAV. By way of example, in a first cycle, GDT 208, of FIG. 2, detects micro-UAV 200 at an elevation of $\theta_1$ 236 and a bearing of $\phi_1$ 240, which can be recorded in a storage medium of GDT 208, as described above. Since micro-UAV 200 is unlikely to have moved much in the time of a given cycle, in the following cycle the recorded values of $\theta_1$ 236 and $\phi_1$ 240 in the storage medium of GDT 208 can trigger a processor of GDT 208 to cause GDT 208 to slow down its slew rate, sweeping at 0.5 Hz within 10 degrees of $\theta_1$ 236 or $\phi_1$ 240—the most likely location of micro-UAV 200. Since micro-UAV 200 is less likely to be more than 10 degrees away from $\theta_1$ 236 or $\phi_1$ 240, a processor of GDT 208 can cause GDT 208 to speed up its slew rate to 2 Hz when in a range of more than 10 degrees away from $\theta_1$ 236 or $\phi_1$ 240.

Returning to FIG. 1A, in some implementations, at 124, the angular relationship data of 120 are processed to determine the first location 252 of micro-UAV 200 of FIG. 2. For example, a primary processor or cloud-based distributed computing system can be configured to receive elevation and bearing data from GDTs 208 and 212 and process such data to determine a location of micro-UAV 200. By way of illustration, a primary processor can triangulate the position micro-UAV 200 based on the signal spikes discussed in the preceding paragraph. In other words, the primary processor can use standard geometry to determine, based on $\theta_1$ 236, $\phi_1$ 240, $\theta_2$ 244, $\phi_2$ 248, and the locations of GDT 208 and GDT 212, that there is a source emitting a 5.8 GHz signal originating at first location 252 where line 256 and line 260 meet. Since the downlink frequency of a standard micro-UAV is 5.8 GHz, the primary processor can infer that there is a micro-UAV at point 252.

In some implementations, a primary processor can be included as a part of one or more scanning apparatuses, such as a GDT. Also or alternatively, a primary processor can be a separate computing device, which is configured to communicate with scanning apparatuses, such as GDTs.

The manner in which GDTs communicate with each other and with a primary processor can vary across implementations. For example, a secure two-way communication channel such as a wired fiber-optic connection can be utilized. Also or alternatively, GDTs and primary processors can communicate through a variety of wireless channels such as via Bluetooth or via a WiFi local area network. Also or alternatively, communications exchanged between GDTs and the primary processor can be encrypted, for example using standard public-key cryptography or other techniques, for enhanced security.

In some implementations, at 128 of FIG. 1A, the first location 252 of micro-UAV 200 of FIG. 2 is disseminated to a variety of sites. For instance, the primary processor can communicate the coordinates of the micro-UAV to an Air Traffic Controller (ATC) such that the ATC can contact pilots of any approaching airliners as well as appropriate authorities. Also or alternatively, the coordinates of the micro-UAV could be communicated directly to an approaching airliner via an appropriate communications protocol, such as an existing Traffic Collision Avoidance System (TCAS) or Automated Dependent Surveillance-Broadcast (ADS-B.)

In some implementations, at 132 of FIG. 1A, a velocity of micro-UAV 200 of FIG. 2 is determined. For example, a primary processor can determine velocity data for an encroaching micro-UAV by averaging the change in coordinates of an encroaching micro-UAV over the time of two or more cycles of rotation of GDTs collecting bearing and elevation data for the encroaching micro-UAV. By way of example, a second location of micro-UAV 200 can be determined using the techniques described above in the context of 104-112 of FIG. 1A. The first location 252 and the second location of micro-UAV 200 can then be used to determine the velocity of micro-UAV 200. For instance, a primary processor can log a first time at which micro-UAV 200 was detected at the first location 252 and a second time at which micro-UAV 200 was detected at the second location. The primary processor can divide the distance between the first location 252 and the second location by the difference between the first and second times to get a magnitude of the velocity of micro-UAV 200. Similarly, the primary processor can determine the directional component of the velocity of micro-UAV 200 by determining the direction of the displacement of micro-UAV 200 between the first location 252 and the second location.

In some implementations, two or more UAVs can be tracked using the disclosed techniques. For instance, some of the disclosed techniques can be used for enhanced scanning of portions of the sky near a sensitive area for detection of multiple micro-UAVs at any given time. Redundant GDTs can be placed near a sensitive area to sweep for and follow multiple micro-UAVs. In one example, returning to FIG. 2, GDTs 208 and 212 might be tracking micro-UAV 200 and GDTs 232 and 216 might be tracking a further micro-UAV.

Alternatively, two scanning apparatuses can be used to track more than one micro-UAV. By way of example, GDTs 208 and 212 can track both micro-UAV 200 and a further micro-UAV. In this case, GDTs 208 and 212 might have redundant antennae if enhanced tracking capabilities are desired.

In some implementations, two or more scanning apparatuses might be placed in the same or similar location, for increased ability to track two or more UAVs. For example, GDT 208 may include more than one scanning apparatus, such as scanning apparatus 300 of FIG. 3, scanning apparatus 400 of FIG. 4, or another scanning apparatus or combination of scanning apparatuses. As such, if GDT 208 includes more than one scanning apparatus, each scanning apparatus of GDT 208 can be used to exclusively track a different micro-UAV at a given time by slowing down its slew rate in the angular vicinity of the tracked micro-UAV, as described above.

Figure 6:
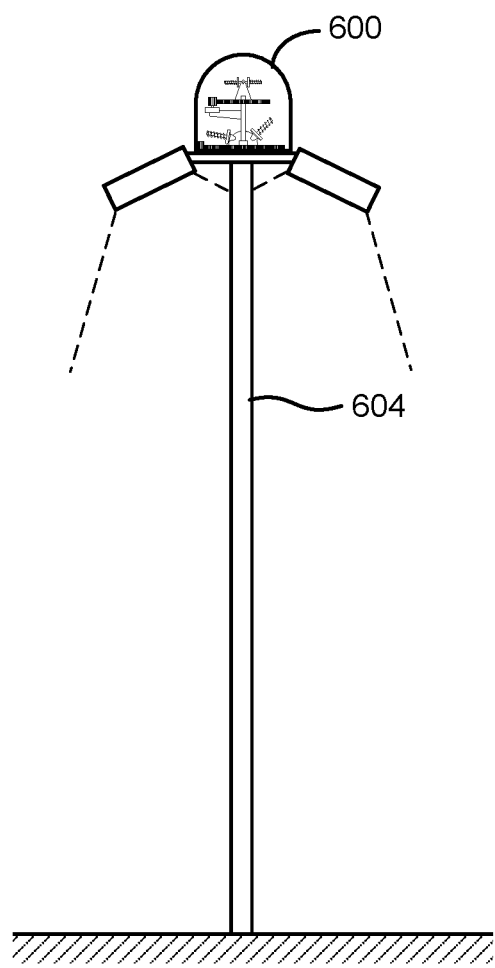
FIG. 6 shows an example of a simplified diagram of a scanning apparatus 600 mounted to a light pole 604 in an airport parking lot or near a runway, in accordance with some implementations.

In some implementations, GDTs, or other scanning apparatuses, can be placed in strategic locations to take advantage of existing structures. For example, FIG. 6 shows an example of a simplified diagram of a scanning apparatus 600 mounted to a light pole 604 in an airport parking lot or near a runway, in accordance with some implementations. For instance, GDT 212 of FIG. 2 might include scanning apparatus 600 of FIG. 6. Placing a scanning apparatus in high location, such as on top of light pole 604, relative to the ground can prevent tampering and aid in avoiding obstructions. Additionally, this placement could allow scanning apparatus 600 to use an already available power source of light pole 604.

Figure 7:
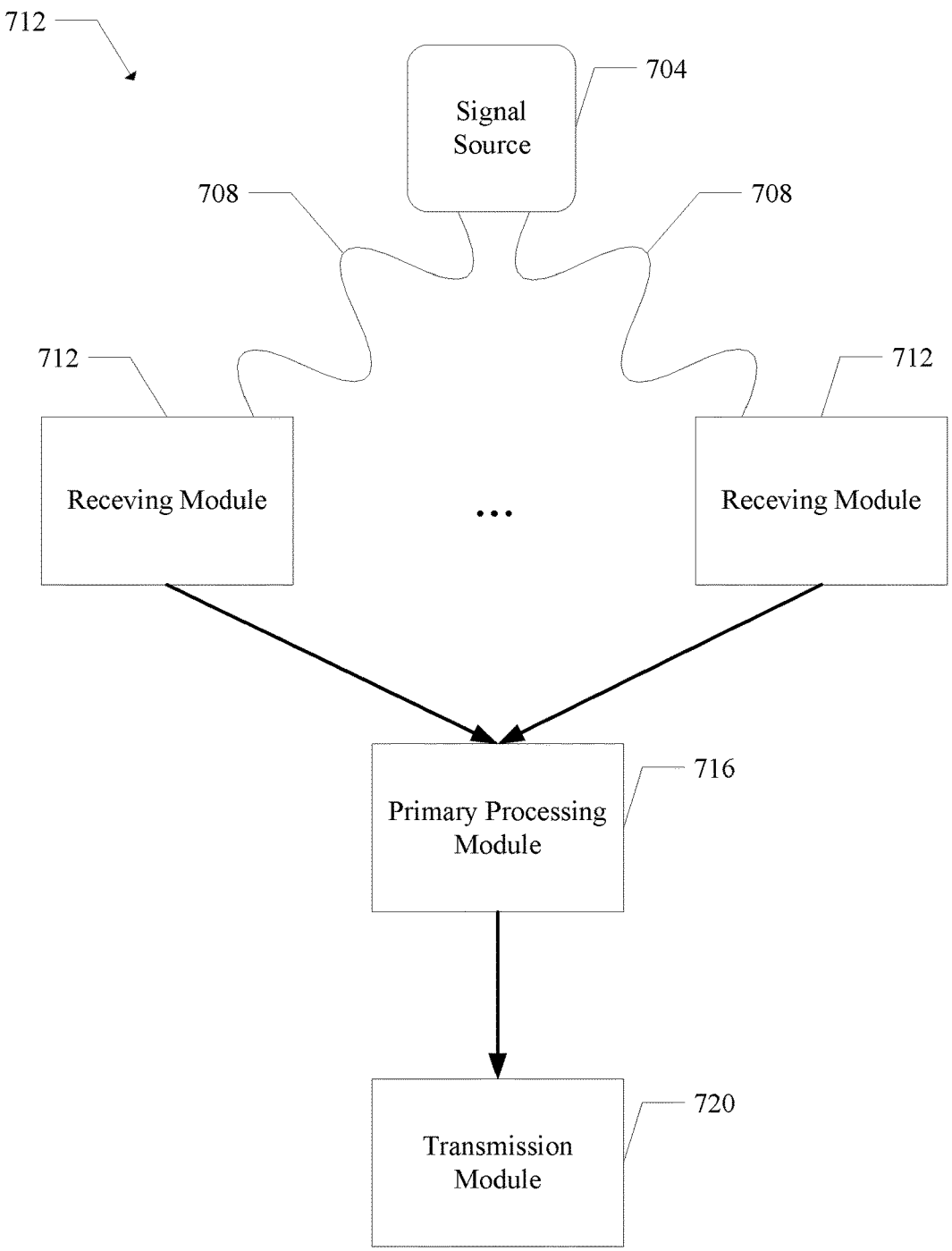
FIG. 7 shows a block diagram of a simplified example of a system 700 for locating UAVs, in accordance with some implementations.

One having skill in the art would appreciate that the disclosed techniques can be applied in a diverse array of contexts, a few of which are described below. More specifically, a variety of scanning apparatuses, such as scanning apparatus 300 of FIG. 3, scanning apparatus 400 of FIG. 4, or another scanning apparatus, can be statically or dynamically deployed in a heterogeneous set of locations and can be used to detect and locate micro-UAVs using some of the disclosed techniques, described above. For instance, FIG. 7 shows a block diagram of a simplified example of a system 700 for locating UAVs, in accordance with some implementations. In FIG. 7, a signal source 704, such as a micro-UAV, emits electromagnetic signals 708. Two or more receiving modules 712, such as any of the scanning apparatuses described above, can be configured to receive signals 708 and transmit bearing and elevation data to a primary processing module 716 using the techniques described above. Primary processing module 716 can process the bearing and elevation data to determine a location of signal source 704 and pass the location to a transmission module 720. The transmission module 720 can transmit the location to a variety of sites, as described above.

In some implementations, system 700 can be deployed near a sensitive building, such as the White House, or a national monument, such as Mount Rushmore or the Eiffel Tower. By way of example, receiving modules can 712 be placed in a perimeter around a sensitive building or monument.

Also or alternatively, system 700 can be deployed in a variety of other locations. For instance, system 700 may be deployed near a prison to prevent incursions of micro-UAVs, which could be used to remotely deliver drugs of weapons into the prison. Similarly, system 700 can be temporarily deployed at events, such as the Super Bowl® or a presidential speech, using portable scanning apparatuses, as described below. By way of illustration, one or more scanning apparatuses might be placed near a building such as the White House. For example, a single apparatus 400 of FIG. 4 might be placed on top of such a building to detect micro-UAVs, and determine a bearing and/or elevation of such micro-UAVs as they approach the building, as described above. If a micro-UAV is detected, the authorities can be alerted, the building can be evacuated, and the micro-UAV can be shot down (or otherwise eliminated) as it enters the vicinity of the building.

On the other hand, a configuration of two or more scanning apparatuses 300 might be place near a building to detect an approaching micro-UAV, and determine accurate three-dimensional coordinates of the approaching micro-UAV, using some of the techniques discussed above in the context of 104-124 of FIG. 1A. In this case, the scanning apparatuses might be in communication with a system configured to automatically shoot down (or otherwise eliminate) the micro-UAV.

As mentioned above scanning apparatuses can be dynamically deployed. For example, scanning apparatus 400 of FIG. 4 can be mounted near the nose of a commercial aircraft, such as a Boeing® 747, an Airbus® A320, an Embraer® ERJ 145, a Fokker® f100, an Irkut® MC-21, etc.

Because such an aircraft can be located high enough to scan radio signals on the ground without being impeded by obstacles such as buildings, mountains, hills, etc., a single aircraft mounted scanning apparatus can be used to locate ground-based micro-UAV operators. By way of example, scanning apparatus 400 can be mounted on a Boeing®, which is approaching an Airport. In this scenario, directional antenna 404 can be configured to receive 2.4 GHz signals—the standard uplink frequency of a micro-UAV. As such, using some of the techniques described above, scanning apparatus 400 can be used to determine the bearing and elevation of a micro-UAV operator on the ground relative to the 747. Since micro-UAV is being operated from the ground, bearing and elevation data from a single scanning apparatus can be sufficient in and of itself to locate the micro-UAV operator without a further signal for triangulation. In other words, since the micro-UAV operator need only be located in two dimensions since she is near to the ground, her bearing and elevation relative to the 747 is sufficient to determine her location. As such, the pilot of the 747 can disseminate the micro-UAV operator's location to the authorities, so that she can be apprehended.

In some implementations, scanning apparatuses can be configured to reject known emissions. By way of example, if a known micro-UAV, or other radio frequency emission source such as a baby monitor, that poses no danger is in the vicinity of GDT 208, GDT 208 can determine, based in information in one or more of its storage media that any signal received from the location of the known micro-UAV should be ignored by GDT 208. As such, a processor of GDT 208 can cause GDT 208 to filter any radio signal originating from the known micro-UAV.

In some implementations, scanning apparatuses, such as those described above, can be made portable. For example, as described above, a scanning apparatus may include a Global Positioning system (GPS). As such even if the scanning apparatus is moved to a new location, the new location of the scanning apparatus can be transmitted to a primary processor, without the need to manually alert the primary processor of the scanning apparatus' new location.

In some implementations, the velocity of a detected micro-UAV can be determined using a single scanning apparatus by analyzing the strength of a signal originating from the micro-UAV as the micro-UAV approaches the scanning apparatus. For example, the signal strength at a given point of a radio signal originating from a source has an inverse-squared relationship with the radial distance between the source and the point. As such, a scanning apparatus can determine the radial velocity of a moving micro-UAV by analyzing the strength of the signal originating from the micro-UAV over time. The angular components of the velocity of the micro-UAV can be determined by measuring the changes in bearing and elevation of the micro-UAV over time.

Figure 8:
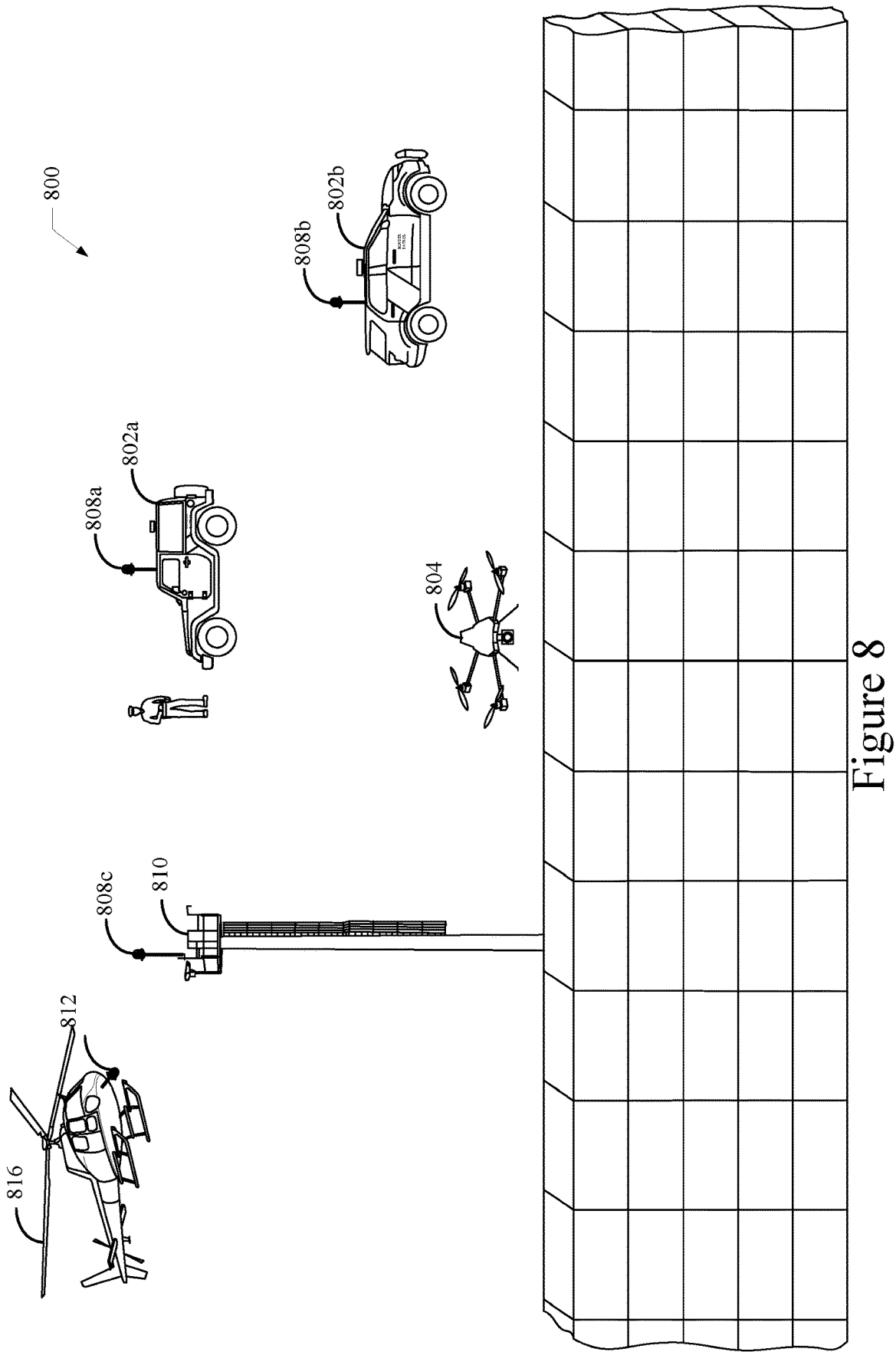
FIG. 8 shows a simplified diagram of a simplified example of a system 800 for locating UAVs, in accordance with some implementations.

The disclosed techniques may be implemented in a variety of sensitive security areas, such as the United States (US)-Mexico border, increasing security by allowing for detection of incursions by UAVs that are too small to be detected using conventional techniques. UAVs may present a particularly great threat at certain locations, such as the US-Mexico border, because UAVs may be capable of flying over existing physical barriers. By way of example, FIG. 8 shows a simplified diagram of a simplified example of a system 800 for locating UAVs, in accordance with some implementations. System 800 is deployed at the US-Mexico border. In FIG. 8, border patrol vehicles 802a and 802b patrol the US-Mexico border. UAV 804 has made an unauthorized incursion across the US-Mexico border. The UAV 804 may present a number of security threats. By way of example, the UAV 804 may contain a camera and may be used by drug or human smugglers for scouting purposes. Also or alternatively, the UAV 804 may be used to transport illegal or dangerous substances such as illegal drugs or explosives. Scanning apparatuses 808a-c may be any type of scanning apparatus configured to receive RF signals from UAVs such as the scanning apparatuses 300 and 400 of FIGS. 3 and 4 respectively.

Such scanning apparatuses may be arranged in a variety of manners. By way of illustration in FIG. 8, the scanning apparatuses 808a and 808b are mounted on border patrol vehicles 802a and 802b, and the scanning apparatus 808c is mounted on a stationary observation tower 810. While the scanning apparatuses 808a-c are depicted in a particular arrangement, one having skill in the art can appreciate that the scanning apparatuses 808a-c may be arranged in a variety of manners. By way of illustration, while the scanning apparatus 808a is mounted on the roof of border patrol vehicle 802a, the scanning apparatus 808a may be placed in any radio-transparent area of the border patrol vehicle 802a that allows the scanning apparatus 808a to perform the UAV location and tracking functions disclosed herein. The scanning apparatuses 808a-c may be configured to scan the airspace over a portion of the US-Mexico border region and receive downlink signals from the UAV 804, as described above. The scanning apparatuses 808a-c may send data to a computing device capable of processing the data, using the triangulation techniques described above, to locate the UAV 804. The US Border Patrol may use the location of the UAV 804 to track and/or neutralize the UAV 804.

Also or alternatively, the UAV 804 may be emitting video data from a camera for scouting purposes. As such, the downlink signal from the UAV 804 received by the scanning apparatuses 808a-c may include such video data from the camera of the UAV 804. Such video data may be provided from the scanning apparatuses 808a-c to a display device such that agents of the US Border Patrol and/or any other relevant law enforcement agency may view video being captured by the camera of the UAV 804.

Similar to the scenarios described above, the operator of the UAV 804 may be located using the disclosed techniques. By way of illustration, scanning apparatus 812 may be mounted on US Border Patrol helicopter 816. The scanning apparatus 812 may be configured to receive uplink signals from the device being used to operate the UAV 804. As such, using the above-described techniques, the source of the uplink signal can be located and the location of the source of the uplink signal may be provided to the relevant law enforcement authorities such as the US Border Patrol and/or the Mexican Federal Police. The law enforcement authorities may then travel to the location of the uplink signal and apprehend the operator of the UAV 804.

One having skill in the art can appreciate that the techniques described above in the context of FIG. 8 may be applicable to a range of additional scenarios. By way of illustration, drugs or other illicit substances are often smuggled into prisons via UAVs. As such, a prison may deploy a network of scanning apparatuses, e.g., in a manner similar FIGS. 2 and/or 8 to detect and locate UAVs in the vicinity of the prison. As described above, operators of such UAVs may be located and apprehended.

In another scenario, UAV incursions often hamper wildfire fighting efforts. Accordingly, firefighting aircraft and/or ground-based firefighting vehicles may be fitted with scanning apparatuses configured to detect and locate UAVs and UAV operators using the above-described techniques. Therefore, UAVs that are hampering wildfire fighting efforts may be quickly and effectively located, critically increasing the efficiency of firefighting efforts.

While various specific implementations have been particularly shown and described, it will be understood by those skilled in the art that changes in the form and details of the disclosed implementations may be made without departing from the spirit or scope of this disclosure. In addition, although various advantages, aspects, and objects have been discussed herein with reference to various implementations, it will be understood that the scope of this disclosure should not be limited by reference to such advantages, aspects, and objects.

What is claimed is:

1. A method for detecting unmanned aerial vehicles (UAVs) in a sensitive security area, the method comprising:

scanning, with a plurality of scanning apparatuses, a region of airspace associated with the sensitive security area, each scanning apparatus comprising one or more Radio Frequency (RF) antennae configured to receive a variable amount of radio wave power, the variable amount of radio wave power received by each RF antenna being configured to vary based on an angle between a propagation direction of the received radio wave power and an axis of the antennae, each of the scanning apparatuses having different locations, at least one of the scanning apparatuses being connected with a moveable vehicle;

receiving first radio frequency signals emitted by a first UAV at the scanning apparatuses, a frequency of the first radio frequency signals being a downlink frequency of the first UAV, the first radio frequency signals being downlink signals generated by the first UAV to communicate with a first device controlling the first UAV, the scanning apparatuses being independent from generation of the first radio frequency signals;

processing, based on a signal strength of the first radio frequency signals at the scanning apparatuses and a relative position of the scanning apparatuses with respect to the signal strength of the first radio frequency signals, the first radio frequency signals to determine a first location of the first UAV; and automatically causing the first UAV to be automatically shot down.

2. The method of claim 1, further comprising:
providing the first radio frequency signals to a display device, the display device being configured to process the first radio frequency signals to cause display of video associated with a camera associated with the first UAV.

3. The method of claim 1, further comprising:
scanning, with an aircraft-mounted scanning apparatus, a region of ground space associated with the sensitive security area, the aircraft-mounted scanning apparatus comprising one or more further directional RF antennae;

receiving, at the aircraft-mounted scanning apparatus, radio frequency signals corresponding to an uplink frequency of the first UAV; and processing, based on an angular relationship between the location of the aircraft-mounted scanning apparatus and a source of the further radio frequency signals, the further radio frequency signals to determine a first location of the source of the further radio frequency signals, the source of the further radio frequency signals being associated with an operator of the first UAV.

4. The method of claim 3, wherein the uplink frequency is in a range of 1850-1990 MHz or 824-894 MHz.

5. The method of claim 1, wherein at least one of the scanning apparatuses is mounted on a stationary observation tower.

6. The method of claim 4, wherein the sensitive security area is a region including a portion of the US-Mexico border.

7. The method of claim 1, wherein processing the first radio frequency signals to determine the first location of the first UAV comprises:
determining a signal strength associated with the first radio frequency signals at each of the scanning apparatuses;
generating, using the signal strength, first data indicating an angular relationship between the locations of the scanning apparatuses and the first UAV;

processing, using the locations of the scanning apparatuses, the first data to determine the first location of the first UAV.

8. The method of claim 1, further comprising:
determining a second location of the first UAV; and
determining, using the first and second location of the first UAV, a velocity of the first UAV.

9. The method of claim 1, wherein the first UAV has a weight of 10 pounds or less.

10. A system comprising a plurality of scanning apparatuses coupled with one or more processors, the system configured to cause:
scanning, with the plurality of scanning apparatuses, a region of airspace associated with the sensitive security area, each scanning apparatus comprising one or more Radio Frequency (RF) antennae configured to receive a variable amount of radio wave power, the variable amount of radio wave power received by each RF antenna being configured to vary based on an angle between a propagation direction of the received radio wave power and an axis of the antennae, each of the scanning apparatuses having different locations, at least one of the scanning apparatuses being connected with a moveable vehicle;

receiving first radio frequency signals emitted by a first UAV at the scanning apparatuses, a frequency of the first radio frequency signals being a downlink frequency of the first UAV, the first radio frequency signals being downlink signals generated by the first UAV to communicate with a first device controlling the first UAV, the scanning apparatuses being independent from generation of the first radio frequency signals;

processing, based on a signal strength of the first radio frequency signals at the scanning apparatuses and a relative position of the scanning apparatuses with respect to the signal strength of the first radio frequency signals, the first radio frequency signals to determine a first location of the first UAV; and automatically causing the first UAV to be automatically shot down.

11. The system of claim 10, the one or more processors being further configured to cause:
providing the first radio frequency signals to a display device, the display device being configured to process the first radio frequency signals to cause display of video associated with a camera associated with the first UAV.

12. The system of claim 10, the system further comprising:
an aircraft-mounted scanning apparatus comprising one or more further directional Radio Frequency (RF) antennae, the aircraft mounted scanning apparatus being configured to cause:
scanning a region of ground space associated with the sensitive security area, and
processing radio frequency signals corresponding to an uplink frequency of the first UAV; and
the one or more processors being further operable to:
processing, based on an angular relationship between the location of the aircraft-mounted scanning apparatus and a source of the further radio frequency signals, the further radio frequency signals to determine a first location of the source of the further radio frequency signals, the source of the radio frequency signals being associated with an operator of the first UAV.

13. The system of claim 10, wherein at least one of the scanning apparatuses is mounted on a stationary observation tower.

14. The system of claim 13, wherein the sensitive security area is a region including a portion of the US-Mexico border.

15. A computer program product comprising computer-readable program code to be executed by one or more processors when retrieved from a non-transitory computer-readable medium, the program code including instructions configured to cause:
   scanning, with the plurality of scanning apparatuses, a region of airspace associated with the sensitive security area, each scanning apparatus comprising one or more Radio Frequency (RF) antennae configured to receive a variable amount of radio wave power, the variable amount of radio wave power received by each RF antenna being configured to vary based on an angle between a propagation direction of the received radio wave power and an axis of the antennae, each of the scanning apparatuses having different locations, at least one of the scanning apparatuses being connected with a moveable vehicle;
   receiving first radio frequency signals emitted by a first UAV at the scanning apparatuses, a frequency of the first radio frequency signals being a downlink frequency of the first UAV, the first radio frequency signals being downlink signals generated by the first UAV to communicate with a first device controlling the first UAV, the scanning apparatuses being independent from generation of the first radio frequency signals;
   processing, based on a signal strength of the first radio frequency signals at the scanning apparatuses and a relative position of the scanning apparatuses with respect to the signal strength of the first radio frequency signals, the first radio frequency signals to determine a first location of the first UAV; and
   automatically causing the first UAV to be automatically shot down.

16. The computer program product of claim 15, the program code including further instructions configured to cause:
   providing the first radio frequency signals to a display device, the display device being configured to process the first radio frequency signals to cause display of video associated with a camera associated with the first UAV.

17. The computer program product of claim 15, the program code including further instructions configured to cause:
   scanning, with an aircraft-mounted scanning apparatus, a region of ground space associated with the sensitive security area, the aircraft-mounted scanning apparatus comprising one or more further directional Radio Frequency (RF) antennae;
   processing, at the aircraft-mounted scanning apparatus, radio frequency signals corresponding to an uplink frequency of the first UAV; and
   processing, based on an angular relationship between the location of the aircraft-mounted scanning apparatus and a source of the further radio frequency signals, the further radio frequency signals to determine a first location of the source of the further radio frequency signals, the source of the further radio frequency signals being associated with an operator of the first UAV.

18. The computer program product of claim 17, wherein the uplink frequency is in a range of 1850-1990 MHz or 824-894 MHz.

19. The computer program product of claim 15, wherein at least one of the scanning apparatuses is mounted on a stationary observation tower.

20. The computer program product of claim 15, wherein the sensitive security area is a region including a portion of the US-Mexico border.

* * * * *